(12) United States Patent  
Schubert

(10) Patent No.: US 8,673,811 B2  
(45) Date of Patent: *Mar. 18, 2014

(54) SYSTEM, METHODS AND MATERIALS FOR STORING AND RETRIEVING HYDROGEN

(75) Inventor: Peter James Schubert, Naperville, IL (US)

(73) Assignee: Peter J. Schubert, Indianapolis, IN (US)

( * ) Notice: Subject to any disclaimer, the term of this patent is extended or adjusted under 35 U.S.C. 154(b) by 434 days.

This patent is subject to a terminal disclaimer.

(21) Appl. No.: 12/888,910

(22) Filed: Sep. 23, 2010

(65) Prior Publication Data

US 2011/0236790 A1    Sep. 29, 2011

Related U.S. Application Data

(63) Continuation-in-part of application No. 10/824,719, filed on Apr. 15, 2004, now abandoned, and a continuation-in-part of application No. 11/744,270, filed on May 4, 2007.

(60) Provisional application No. 60/477,156, filed on Jun. 9, 2003, provisional application No. 60/474,721, filed on May 30, 2003.

(51) Int. Cl.  
*B01J 20/00* (2006.01)  
*H01M 8/04* (2006.01)

(52) U.S. Cl.  
USPC ............ 502/407; 502/400; 502/415; 429/516

(58) Field of Classification Search  
None  
See application file for complete search history.

(56) References Cited

U.S. PATENT DOCUMENTS

| | | | |
|---|---|---|---|
| 5,196,377 A * | 3/1993 | Wagner et al. ................. 438/384 |
| 2004/0016769 A1 * | 1/2004 | Redmond .......................... 222/3 |
| 2004/0191589 A1 * | 9/2004 | Katamura et al. ............... 429/19 |
| 2004/0213998 A1 * | 10/2004 | Hearley et al. ................. 428/402 |

* cited by examiner

*Primary Examiner* — Ula C Ruddock  
*Assistant Examiner* — Tony Chuo  
(74) *Attorney, Agent, or Firm* — Hartman Global IP Law; Gary M. Hartman; Domenica N. S. Hartman

(57) ABSTRACT

A system for storing and retrieving elemental hydrogen. The system includes a housing, a hydrogen storage element enclosed within the housing and having a solid-state hydrogen storage material, and a control system for regulating storage of hydrogen into and retrieval of hydrogen from the storage material. At least a portion of the storage material is a porous matrix material having atoms of a first element capable of bonding with more than one hydrogen atom per atom of the first element, and atoms of a second element capable of molecularly bonding to atoms of the first element and hydrogen. Different atoms of the first element have bond sites available for different numbers of hydrogen atoms at different levels of bonding energy. The atoms of the second element are bonded to those atoms of the first element having bond sites for more than one hydrogen atom.

20 Claims, 5 Drawing Sheets

SYSTEM, METHODS AND MATERIALS FOR STORING AND RETRIEVING HYDROGEN

CROSS REFERENCE TO RELATED APPLICATIONS

This is a continuation-in-part patent application of U.S. patent application Ser. No. 10/824,719, filed Apr. 15, 2004, which claimed the benefit of U.S. Provisional Patent Application Ser. No. 60/474,721, filed May 30, 2003 and U.S. Provisional Patent Application Ser. No. 60/477,156, filed Jun. 9, 2003. This is also a continuation-in-part patent application of co-pending U.S. patent application Ser. No. 11/744,270, filed May 4, 2007. The contents of these prior applications are incorporated herein by reference.

BACKGROUND OF THE INVENTION

The present invention generally relates to hydrogen storage systems and methods. More particularly, this invention relates to a system and method for recharging a porous hydrogen storage media through the use of a catalyst, and by which up to almost 100% of the original quantity of hydrogen stored in the media can be replenished.

Hydrogen fuel cells are being considered for a wide variety of power applications, including but not limited to mobile applications such as vehicles. However, more conventional hydrogen storage technologies suffer from significant drawbacks that make them ill-suited for mobile applications such as passenger vehicles. For example, compressed hydrogen gas requires heavy tanks and very high pressures that would pose a potential hazard in a crash, and liquified hydrogen can cause skin damage if released and requires active refrigeration that is energy-intensive and requires considerable insulation. Hydrogen storage for vehicles and other mobile applications would benefit from solid-state storage, which uses more moderate temperatures and pressures, and is thus more attractive for use with vehicles as well as other applications, including stationary power systems and consumer electronics.

The use of porous silicon as a solid-state storage media for hydrogen is quite new, as exemplified by U.S. Published Patent Application No. 2004/0241507 by Schubert et al. and a paper authored by Lysenko et. al., in J. Phys. Chem. B 2005, 109, pg 19711-19718. Both focus on the initial charge of hydrogen in a porous silicon media, with little emphasis concerning recharging the media. In Schubert, et al., the description briefly mentions the use of catalysts, teaching that chemical activation may include the electrodeposition of a catalyst, for example, palladium or platinum, onto a silicon surface to facilitate bonding of hydrogen to the surface. Schubert et al. also teach that the activation energy of silicon can be enhanced, such as by deposition of a catalyst material to reduce the energies of adsorption or desorption from a silicon surface. As such, Schubert et al. are concerned with modifying the bond energy of hydrogen to a silicon surface for purposes of attaching or detaching hydrogen.

A complication with the use of silicon as a hydrogen storage media is the tendency for silicon to reform upon dehydrogenation. In other words, once hydrogen atoms leave the silicon atoms to which they are bonded, the remaining silicon dangling bonds reconnect with their neighbors through silicon-to-silicon bonding, making a substantial fraction of the original bond sites no longer available to participate in hydrogen storage. Farjas et al., Phys. Rev. B, 65, (2002) 115403, entitled "Calorimetry of Hydrogen Desorption from a-Si Nanoparticles," experimentally verified that 96% to 99% of dangling bonds recombine upon dehydrogenation of amorphous silicon films. Such low recharge capabilities render gaseous recharging of solid-state hydrogen storage systems impractical for vehicular and many other applications, and consequently necessitates recharging by aqueous methods. While aqueous recharging methods are known and practical, gaseous recharging methods have certain advantages, including initial acceptance and planning by industry and government agencies.

BRIEF SUMMARY OF THE INVENTION

The present invention provides solid-state hydrogen storage materials and processes for making solid-state hydrogen storage materials more thoroughly rechargeable, as well as provides apparatuses and systems in which such materials can be used for storing and retrieving elemental hydrogen. The process of this invention is believed capable of achieving a full or nearly-full recharge, thereby reducing the cost of owning and operating a hydrogen storage system and making the use of such storage systems practical for use in a wide variety of applications, including but not limited to powering fuel cells for vehicles, stationary power systems, and consumer electronics, and non-power applications including chemical production.

According to a first aspect of the invention, a system for storing and retrieving elemental hydrogen a housing, a hydrogen storage element enclosed within the housing and comprising a solid-state hydrogen storage material, and a control system for regulating storage of hydrogen into and retrieval of hydrogen from the solid-state hydrogen storage material. At least a portion of the solid-state hydrogen storage material comprises a porous matrix material comprising atoms of a first element capable of bonding with more than one hydrogen atom per atom of the first element. The atoms of the first element are molecularly arranged within the porous matrix material so that different atoms of the first element have bond sites available for different numbers of hydrogen atoms at correspondingly different levels of bonding energy. The porous matrix material further comprises hydrogen atoms molecularly bonded to atoms of the first element, with some atoms of the first element having more hydrogen atoms bonded thereto than other atoms of the first element. The porous matrix material also comprises atoms of a second element capable of molecularly bonding to atoms of the first element and hydrogen. The atoms of the second element are bonded to those atoms of the first element having bond sites for more than one hydrogen atom and as a consequence at lower bond energies than the bond sites of those atoms of the first element to which a fewer number of hydrogen atoms are bonded.

Additional aspects of the invention include the use of the system in an auxiliary power unit, auxiliary power units comprising the system, and vehicles equipped with an auxiliary power unit that comprises the system.

The system, storage material and process of the present invention address various factors that have previously been impediments to solid-state hydrogen storage media. First, the invention addresses dangling bond recombination, which poses a significant loss of recharge capacity for solid-state hydrogen storage materials. Recognizing that gaseous recharge with molecular hydrogen ($H_2$) is insufficient to overcome the recombined dangling bond energy of silicon (and other potential storage media materials), the present invention provides a process in which the second element serves as a catalyst that is not limited to enhancing the activation energy of a storage material. Instead, the process of this invention employs the second element (catalyst) to inhibit reforming of silicon dangling bonds after dehydrogenation that would result in silicon-to-silicon bonds and reduce the number of bond sites available to participate in hydrogen storage. As such, the second element is able to preserve bond sites for hydrogen bonding during subsequent rehydrogenation. Through the use of a catalyst in this manner, a solid-state hydrogen storage material can be potentially made at lower cost and weight and processed and operated at lower temperatures compared to the prior art. As such, the present invention is capable of significantly increasing the practicality, functionality and economics of solid-state hydrogen storage systems.

Other objects and advantages of this invention will be better appreciated from the following detailed description.

DETAILED DESCRIPTION OF THE INVENTION

Figure 1:
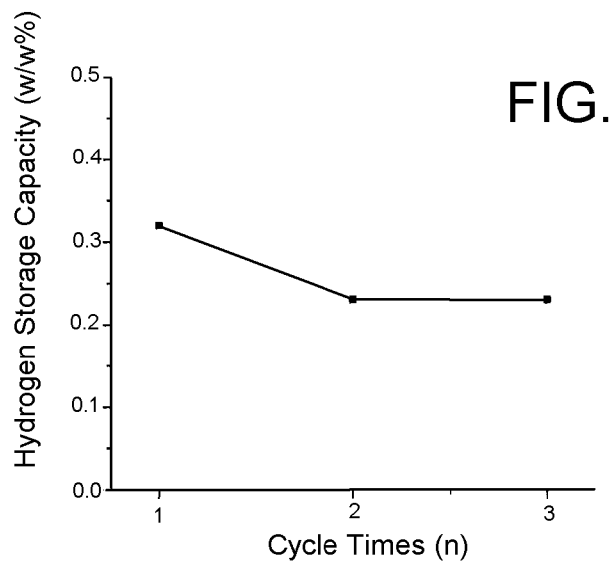
FIG. 1 is a graph representing the declining hydrogen storage capacity of a porous silicon storage material when attempting to recharge the material with the same electrochemical etch originally used to form and charge the material.

The present invention describes systems, processes and solid-state storage materials with which full or nearly-full recharging can be attained for hydrogen onto the material. The invention addresses problems resulting from dangling bonds of a storage material reforming upon dehydrogenation, making fewer sites available for subsequent hydrogen storage (recharging). The present invention overcomes these problems by treating the storage material to remove those hydrogen atoms that are least energetically bonded to atoms of the storage material, and thereby intentionally create sites with dangling bonds, while not removing hydrogen atoms that are more energetically bonded to atoms of the storage material. A catalyst is then introduced into the storage material that molecularly bonds with the dangling bonds, after which hydrogen recharging can be repeatedly performed without significantly loss of hydrogen bonding sites within the storage material. Furthermore, recharging can be performed without significantly reducing the mass of the storage media. As a result, multiple recharges can be performed that achieve near-complete recharging of hydrogen, for example, at least 90% and more preferably at least 99.98% relative to the original charge, with charge levels believed to be reduced only by contaminants such as dissolved oxygen or other impurities.

In the following discussion, porous silicon will be the focus as the solid-state storage media, though it should be appreciated that other materials may be used in place of silicon, for example, elements and compounds such as germanium, gallium arsenide, indium antimonide, or other periodic table III-V or II-VI compounds. Porous silicon (pSi) is a particularly attractive candidate as solid-state storage media for hydrogen, such as when storing hydrogen for use as a fuel in internal combustion engines, fuel cells, etc., because of the ability of its atoms to adsorb (bond) relatively large amounts of hydrogen, generally about six to seven percent hydrogen by weight. The natural color of silicon is dull silver, whereas as-produced, fully hydrogenated porous silicon media ranges from yellow to reddish-brown in color. After dehydrogenation, the media becomes dark, almost black in color. This color change is due in part to the loss of hydrogen.

At this point, it is worth noting that there is some debate as to whether the bonding of hydrogen to a solid-state storage media is through adsorption or absorption. More technically correct terms may be "chemisorb" or "physisorb," corresponding to absorb and adsorb, respectively. While not wishing to be held to any particular theories, porous silicon without a catalyst is believed to be in the chemisorb region (because it requires a good deal of heat to unbond), but is believed to be somewhere between chemisorption and physisorption when modified to contain a catalyst in accordance with this invention. For convenience, "adsorb" will be used to refer to the interaction between hydrogen atoms and solid-state storage media, though without intending to be limited by the technical meaning of this term.

While research has successfully developed processes to achieve very nearly the theoretical maximum hydrogen storage rate in porous silicon, attempts to recharge the hydrogen after dehydrogenation have achieved recharge levels of far less than 100% of the as-synthesized porous silicon. For a hydrogen storage media to be practical for many applications, it is desirable if not necessary for all or nearly all of the hydrogen storage sites on the media to be available for subsequent hydrogenation. With such a capability, the hydrogen storage media would be almost fully rechargeable, thereby greatly reducing the cost of ownership.

Various techniques can be employed to initially charge porous silicon with hydrogen, though particularly good results have been achieved by etching P-type <100> oriented silicon wafers having resistivities of about 7 to 10 Ohm-cm. A suitable charge process is carried out in concentrated (49%) aqueous hydrofluoric acid (HF) with a submerged platinum wire electrode biased galvanostatically to provide an approximately 70 mA/cm$^2$ current density (requiring a power supply capable of greater than 100 Volts). The etch-hydrogenation processing is preferably carried out in the dark and without agitation and the HF solution is preferably changed every hour, with about three hours being a suitable etch duration. After etching, the now porous, hydrogenated silicon material is dried, preferably using pentane.

The hydrogen storage rate of a hydrogenated material can be measured using a temperature programmed desorption (TPD) technique well known to those skilled in the art. During TPD, a material is gradually heated so that its temperature rises in a linear fashion over time, and the evolved species (in this case, hydrogen) is measured as a function of temperature. If storage rate is the only parameter of interest, a hydrogenated silicon material may be heated as rapidly as practical, and the total hydrogen mass then measured. Dividing the mass of released hydrogen by the mass of the porous silicon remaining then gives the storage rate on a percentage basis by weight. The rate of evolution of hydrogen over temperature can also be obtained by TPD, and is useful for providing details of the energetics of bonding between the hydrogen and silicon matrix material. A summation, or integration, of the evolution rate over temperature then gives the total amount of hydrogen released.

Prior to the present invention, efforts have been made to achieve a high recharge rate for porous dehydrogenated silicon. One such approach is to recharge a dehydrogenated silicon material by exposure to hydrogen gas ($H_2$), with the expectation that the material will adsorb at least some hydrogen. However, in practice this approach (gaseous adsorption or recharging) has been found to be inadequate. For example, in one experiment flowing hydrogen gas through a TPD apparatus immediately following dehydrogenation resulted in storage rates (weight fraction) of only about 0.02 to 0.04 of the original mass of adsorbed hydrogen. Several variations of this technique were attempted, including cooling the sample after dehydrogenation before introducing the hydrogen gas and followed by a second TPD, and introducing the gas at an elevated temperature immediately after dehydrogenation and then cooling the sample before performing a second TPD. The results of both techniques were a hydrogen storage (by weight) of approximately 0.1%, compared to an initial storage rate of about 5% by weight.

As will become evident from the following discussion, and while not wishing to be held to any particular theory, it is believed that the poor storage rates obtained with gaseous hydrogen recharging were the result of silicon dangling bonds forming in the dehydrogenated silicon material and then, to form a lower-energy solid, bonding to create silicon-to-silicon bonds between neighboring silicon atoms. This hypothesis is supported by studies of silicon dimers that can form even on bare <100> oriented silicon surfaces. The sticking coefficient of hydrogen on silicon is very low (about $10e^{-8}$) even in high vacuum, so the energetics of hydrogen forcing its way between dimerized silicon bonds are not favorable.

Figure 2:
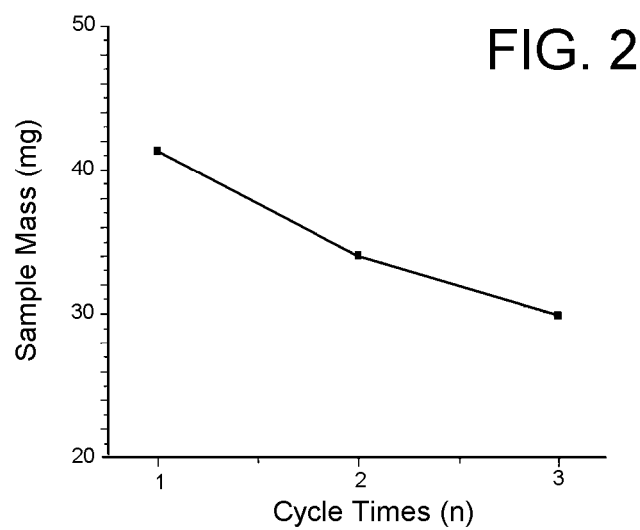
FIG. 2 is a graph representing the declining mass of a porous silicon storage material when attempting to recharge the material using an electrochemical etch.

Another approach for recharging porous silicon materials is to subject the material to the same electrochemical etch used to create (etch and hydrogenate) the material. However, FIGS. 1 and 2 evidence a limitation to an aqueous adsorption-recharging approach. FIG. 1 plots the hydrogen storage capacity (by weight percent) of an as-etched (n=I) porous silicon material, as well as the hydrogen storage capacity of the same material following a second etch (n=2) and a third etch (n=3). The aqueous recharge/etch solution was HF, and the porous silicon material was exposed to air between etch cycles. As evident from FIG. 1, the storage rate dropped about 30% following the first etch-charge cycle, but then dropped very little if at all following the second etch-recharge cycle (error is about 5% for the data plotted in FIG. 1). FIG. 2 plots the mass of the porous silicon material after each etch cycle, and evidences a significant loss of mass with each subsequent etch-recharge cycle, dropping about 10 to 20 weight percent with each etch cycle. After just six such recharge cycles, and factoring the initial drop in storage capacity after the first recharge cycle, the storage rate of the material would drop to only about one-quarter of its original charge capacity. Because the silicon material was exposed to air between etch cycles and HF removes silicon oxides, such a drop in storage rate might be averted to some degree by avoiding contact with air and/or the use of an acid other than HF. Otherwise, for vehicle applications, a storage media formed of a porous silicon material and etched by HF in the manner described above would require replacement after only a few refills.

Though the gradual loss of silicon with each re-etch was undesirable, it was the basis for an important observation. Whereas approximately 75 percent of the original silicon matrix was consumed in the first etch that produced the porous silicon, only about 10 to 20 percent of additional silicon was lost with each re-etch. This observation suggested that the silicon material differed in some manner with each subsequent etch, or at least different in comparison to the original silicon material.

To understand how this observation led to the use of a catalyst in the present invention, it is instructive to review the nature and behavior of catalysts. As known in the art, a catalyst is a material (compound or element) whose presence accelerates a chemical reaction, but remains unchanged after the reaction is complete. Catalysts are often used to accelerate chemical reactions, which they accomplish by reducing the energy barrier (activation energy) between a starting chemical state and a final chemical state. Because of their ability to reduce specific energy barriers, they also can be used to enhance selectivity to a desired reaction pathway in circumstances where a multiplicity of competitive reactions are possible. They are used to lower temperatures at which reactions are conducted, to enhance selectivity, reduce waste, and improve the yield of desirable products. Previously noted U.S. Published Patent Application No. 2004/0241507 to Schubert et al. makes use of a catalyst in a manner consistent with the last stated purpose, namely, reducing the temperature required to desorb hydrogen or reducing the temperature required to adsorb hydrogen. Though an important advantage for initially charging a solid-state hydrogen storage material, such a capability does not address or remedy the inability to fully recharge the material following dehydrogenation (discharge).

The present invention makes use of a catalyst following only a partial dehydrogenation of a solid-state hydrogen storage material. For purposes of the present invention, palladium (Pd) is believed to be a preferred element for the catalyst as a result of having unique properties that appear to be particularly beneficial to the invention. Though other elements such as platinum, ruthenium and other noble metals, as well as iron, nickel, alumina, and other formulations known to those skilled in the art may also be used as the catalyst, palladium will be used to illustrate what is believed to be the preferred embodiment of the invention. Two unique properties of palladium are of particular interest to the invention. A first is that aqueous-borne palladium with a 2 oxidation state (Pd(II)) can be introduced to a silicon surface, where it becomes covalently bonded to the silicon to become Pd(0). In this case, silicon acts as an oxidizer and forms a strong bond with the Pd atom. The second property of interest is the ability for palladium to help sever silicon-silicon bonds. As will become evident from the following discussion, this latter property is important in view of the aforementioned theory that silicon dangling bonds form in dehydrogenated porous silicon, resulting in the formation of silicon-silicon bonds and thus reducing the number of bond sites available to participate in hydrogen storage.

Figure 3:
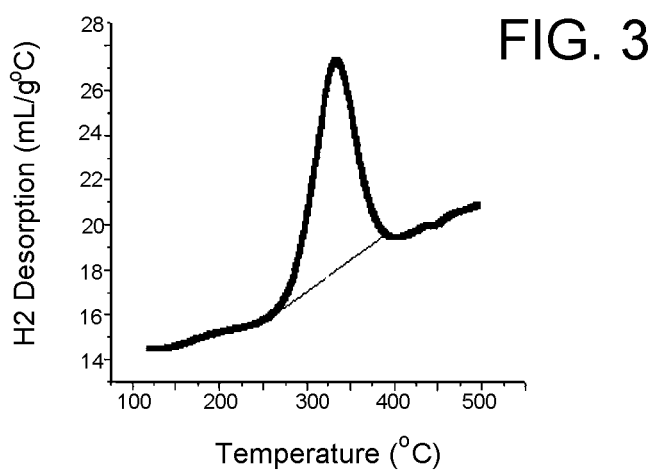
FIG. 3 is a graph plotting hydrogen release versus temperature for a porous silicon storage material.

As noted above, a suitable starting material for use in the present invention is silicon, and particularly the aforementioned P-type <100> oriented silicon etched with concentrated aqueous hydrofluoric acid as described above. However, it should be understood that other solid-state storage media capable of being etched and hydrogenated could also be used, as known to those skilled in the art. From TPD data obtained from studies of hydrogen storage in porous crystalline silicon, release of hydrogen (dehydrogenation) is known to begin at approximately 275° C., as indicated in FIG. 3. The peak release rate occurs at about 335° C., and by about 410° C. essentially all of the hydrogen has been released. The range of temperatures over which hydrogen is released indicates that hydrogen bond energies within the porous silicon material also span a range of levels. Hydrogen atoms most weakly bonded to the porous silicon are released at the lowest temperatures, while more strongly bonded hydrogen atoms are released at higher temperatures within the range plotted in FIG. 3. Because silicon and hydrogen have a natural affinity, those weakly bonded hydrogen atoms presumably reside at bond sites where silicon atoms are bonded to greater numbers of hydrogen atoms. FTIR (Fourier Transform Infra Red) studies were performed to assess silicon-hydrogen bonding energies, from which it was determined that the predominant bonds in hydrogenated silicon are Si—H and Si—H—H, though there is a small percentage of Si—H—H—H bonds. Silicon atoms with three hydrogen bonds are likely to have weaker bonds, and would therefore be among the first to desorb their hydrogen atoms at the lower temperatures of the desorption curve, resulting in the first incidence of silicon dangling bonds. Consequently, silicon atoms from which hydrogen atoms are first released also have relatively fewer bonds with their neighboring silicon atoms. Thus, silicon atoms that give up hydrogen atoms more readily are likely to be more weakly bonded with the remainder of the porous silicon matrix.

As dehydrogenation proceeds and the porous silicon increases in temperature, the dangling bonds exposed on the silicon atoms become more reactive. This greater reactivity, plus the fact that higher temperatures render the silicon more susceptible to flexure, is believed to allow the dangling bonds to reform between neighboring silicon atoms. This mechanism is likely to reduce the recharge rate of silicon, as discussed above. Because reforming first occurs with those silicon atoms most weakly bonded to multiple hydrogen atoms, the onset of the mechanism that reduces the recharge rate of the porous silicon is believed to occur at the lowest dehydrogenation temperatures.

On the basis of the above, the present invention seeks to enhance the recharge rate of solid-state hydrogen storage media by addressing these weakest-bonded silicon atoms. After creating a preferably fully-hydrogenated porous silicon material (such as with the process described above), the material is partly dehydrogenated to remove only a small fraction of the hydrogen atoms, specifically those bonded to the weakest-bonded silicon atoms, which as discussed above are those silicon atoms bonded to multiple hydrogen atoms and particularly Si—H—H—H bonds. This step can be carried out, for example, by heating the storage material to a temperature of less than that required to fully dehydrogenate the material, for example, less than 410° C. if the storage material is silicon. In practice, a suitable temperature for silicon is believed to be approximately 282° C., at which approximately one of twenty-five hydrogen atoms are believed liberated. However, it is foreseeable that temperatures as low as 125° C. (and possibly lower) could be used with some success if sufficient treatment durations are used. Furthermore, the amount of hydrogen atoms released can vary, with a lower practical limit being about one part per million and an upper practical limit being about six percent, though the latter could be increased with the use of appropriate storage media materials. Based on the amount of hydrogen atoms released, the partial dehydrogenation process can be monitored to provide an endpoint that is independent of time or temperature. After treatment, the material is cooled to preserve the remaining hydrogen atoms stored within the medium.

Following the controlled partial dehydrogenation step, the desired catalyst is introduced into the storage material. This step can be carried out using various methods known to those skilled in the art. In the present example, a quantity of Pd(II) can be introduced into the storage material in an aqueous solution. One such technique discussed below is taught by Vasic et al., J. Serb. Chem. Soc. 69(4), pg. 309-317. Other formulations are available commercially, for example, from Johnson Matthey Catalysts. The Vasic et al. process entails dissolving powdered Pd (such as "black palladium") in aqua regia. Buffering of the solution may be accomplished with sodium citrate or other solutions known to those skilled in the art.

Because oxygen is highly reactive with silicon dangling bonds, a preferred characteristic of the Pd(II) solution is a very low dissolved oxygen content. Oxygen can be removed, for example, by heating the solution to its boiling point, by lowering the pH of the solution, or by other means known to those skilled in the art. Because Pd(II) has an affinity to silicon, and weakly-bonded silicon atoms are very likely to have more than one dangling bond available, a Pd(II) atom is able to covalently bond with a single silicon atom and become covalently bonded as Pd(0). This result is believed to place the catalyst strategically on the porous silicon framework, because the palladium atoms are in the very place where their ability to sever Si—Si bonds will help prevent reforming of the silicon dangling bonds during dehydrogenation.

Figure 4:
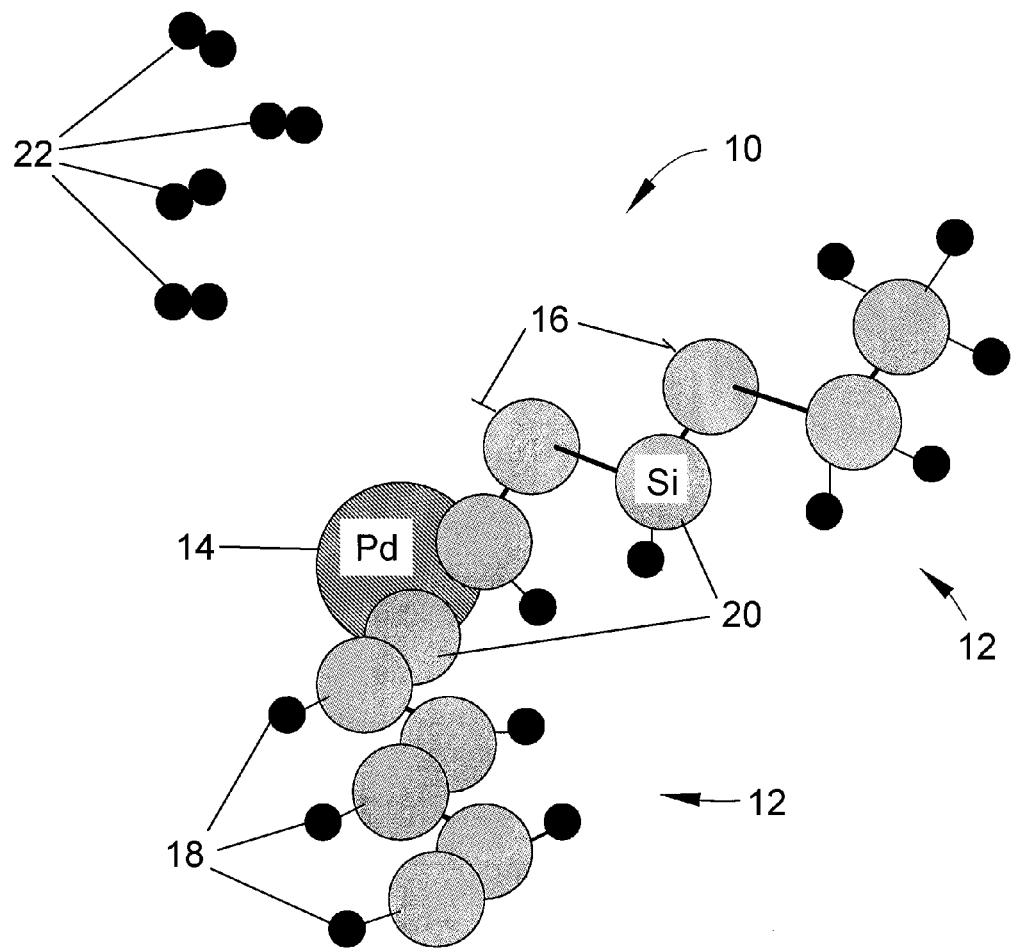
FIG. 4 schematically represents a porous silicon storage material at a molecular level, and depicts the material as having a palladium atom covalently bonded to silicon dangling bonds that were exposed by partial dehydrogenation of the material in accordance with the present invention.

FIG. 4 schematically represents a fragment of a porous silicon matrix 10, and illustrates several of the points discussed above. The precise atomic arrangement of porous silicon is not necessarily made of a single repeatable unit cell, as in a single crystal, so the configuration of atoms in FIG. 4 is meant to express one representative formation of matter. Other configurations exist, and it will be realized that this embodiment is meant to teach, but not restrict, the present invention. In FIG. 4, two filaments 12 of the porous silicon matrix 10 are shown intersecting at a point occupied by a palladium atom (Pd(0)) 14. Elsewhere in the matrix 10, silicon dangling bonds 16 can be seen that were exposed by partial dehydrogenation of the matrix 10, such as in accordance with the partial dehydrogenation process described above. The palladium atom is present at the intersection point as a result of a Pd(II) atom which has been covalently bonded to dangling bonds that were exposed by partial dehydrogenation, and which prior to partial dehydrogenation may have originally been a Si—H—H—H bond similar to what is shown in the upper righthand corner of FIG. 4. The large Pd atom 14 is a permanent addition to the porous silicon matrix 10. Upon heating or other means of dehydrogenation, the molecular hydrogen atoms 18 bonded to the silicon atoms 20 of the matrix 10 can migrate (bond hop) to the Pd atom 14, where pairs of hydrogen atoms 18 can be released as molecular hydrogen 22. Silicon dangling bonds 16 near the Pd atom 14 serve as a conduit for more remote hydrogen atoms 18 to migrate along the silicon filaments 12 until they reach the catalytic Pd atom 14. The presence of the Pd atom 14 also serves to accelerate the reverse reaction as described above.

Following incorporation of the Pd catalyst, the porous silicon storage material can be dried and ready for use, which by intent involves dehydrogenation as a result of hydrogen discharge from the material. Because the palladium atoms are located in those locations within the silicon material most prone to forming dangling bonds during dehydrogenation, the catalyzed storage material of this invention is able to preserve bond sites for hydrogen storage over a far greater number of rehydrogenation cycles than previously possible.

From the foregoing, it should be understood that the present invention makes use of a catalyst to inhibit reforming of dangling bonds present—and even intentionally created—within a hydrogen storage medium, with the effect that, aside from the sites occupied by catalyst atoms (and prone to silicon reforming), all or nearly all of the remaining hydrogen storage sites on the media will be available for subsequent hydrogenation. In accordance with the teachings of Schubert et al., an additional effect of the catalyst is to reduce the discharge temperature of the storage medium. A further advantageous effect arises from the fact that hydrogen atoms on the surface of a solid generally have a high mobility. This is true even when the bond energy is relatively high, as in the case of Si—H and Si—H—H bonds within hydrogenated porous silicon. Individual hydrogen atoms are able to move with relative ease from one silicon bond site to another, provided the distance is not too great. Therefore, on the surface of the filaments and framework of a hydrogenated silicon material, hydrogen atoms are able to migrate from one silicon atom to another. With palladium atoms placed at high-energy points of this framework and capable of bonding with hydrogen, nearby hydrogen atoms may readily interact with the atomic orbitals of the palladium catalyst and form H—H bonds that allow the hydrogen to be released as a stable gas ($H_2$). Furthermore, the vacancy left by a just released hydrogen atom in the vicinity of a palladium atom acts as a concentration gradient, encouraging other hydrogen atoms to migrate into this vacancy. In this way, a porous silicon framework that has been partly dehydrogenated and then doped with palladium in accordance with this invention may effect a more rapid and lower-temperature release of hydrogen gas than the as-produced porous silicon framework alone.

In addition, compared to the prior art description of electrodepositing a catalyst onto an as-produced silicon framework, the method of the present invention is believed to achieve a more strategic placement of catalyst and require less catalytic material. Since catalysts such as palladium and other noble metals are expensive and heavy, the present invention can achieve improvements in cost and weight reduction not possible with the manner in which catalysts were previously used in hydrogen storage media.

Following dehydrogenation of the storage material resulting from hydrogen discharge in the intended application, the catalyst-doped porous silicon material can be recharged by any suitable process. Notably, gaseous adsorption, described above as having certain drawbacks in prior art storage systems, may now be practical with storage systems using catalyst-doped storage materials of the present invention. First, because the porous silicon framework is at least partly prevented from reforming after dehydrogenation, hydrogen is not required to split the dimer bond described above. Second, the presence of the catalyst, distributed strategically across the porous silicon framework, greatly reduces the energy barrier required to separate the H—H bond, liberating individual hydrogen atoms which can then bond with silicon dangling bonds.

Aqueous adsorption with aqueous acid solutions having low oxygen contents is also practical as a recharging technique. By definition, an acid will have $H^+$ ions available in a concentration measured by the pH of the solution. As these free ions are readily available for bonding, just as with the original electrochemical etch, they can attach to the silicon dangling bonds and recharge the storage media with hydrogen. This reaction will proceed more rapidly and efficiently with an applied potential, as described in the aqueous charging process described above. For purposes of the present invention, it is believed that pH and current density can be optimized to effect recharge in a reasonable period of time with a reasonable amount of required energy. Likely suitable ranges for pH and current density are, respectively, about 1 to 7 and up to about 1 Amp per square centimeter exposed area, with preferred values for these parameters being determinable by the application for which the storage media is to be used.

In vehicle applications, any of the recharging methods discussed above can be applied with relative ease. For example, in a vehicle equipped with a hydrogen storage tank containing the storage media and equipped with inlet and outlet ports, hydrogen gas can be pumped into the tank to recharge the storage media. Alternatively, an aqueous recharge approach can be used by introducing a weak acid such as citric acid or oxalic acid into the storage tank. As the weak acid passes through the tank and contacts the storage material, the exposed silicon dangling bonds of the storage material attract the $H^+$ ions and recharge the material. The effluent can be captured and re-energized by any of a number of techniques well-known to those skilled in the art.

With each of these recharging techniques, a catalyst-doped porous storage material can be recharged by adsorbing molecular hydrogen. In such applications, it is important to prevent the introduction of contaminants such as oxygen and moisture, which can poison the storage media and reduce the recharge rate. With the use of a catalyst as taught herein, oxygen poisoning may be the only significant mechanism by which the recharge rate is reduced. Though at a quantum mechanical level there is always a likelihood of reforming, reducing the recharge rate over time and with each recharge cycle, for practical purposes the present invention enables a solid-state hydrogen storage media to be used many times at a far better recharge rate than previously possible with porous silicon. This capability favorably impacts the cost of ownership, making the technology attractive to a wider range of applications.

While the invention has been described thus far in terms of particular embodiments, it is apparent that other forms could be adopted by one skilled in the art. For example, various alternative techniques could be employed to dehydrogenate select silicon atoms in porous silicon media. While heat is described above, a variety of other means are available for dehydrogenation that, used in a partially-complete manner, will sever the bonds between hydrogen and silicon atoms of various configurations. For example, electrical biasing can be used for dehydrogenation, either alone or in combination with elevated temperatures. Because electric fields concentrate on structures having smaller radii of curvature, electric fields can be applied to dehydrogenate silicon atoms at sharp corners of a porous silicon matrix. Dehydrogenation techniques can also employ photon energy. In one nonlimiting example, an incident light flux can be used to release more hydrogen atoms at the surface of a porous silicon matrix. Because of their potential for selectivity, electrical biasing and photon energy may be potentially used to provide specific benefits for certain applications. Any combination of these and other methods, and/or sequential use of two or more methods, are also within the scope of this invention.

As mentioned above, other porous solid-state materials may be used instead of silicon. Suitable materials are believed to include, but are not limited to, alumina, activated carbon, metal hydrides, metal nitrides, zeolites, and other such materials that are or can be rendered porous and capable of adsorbing hydrogen. Similarly, catalysts other than palladium can be used, including but not limited to other noble metals, transition metals, and other metals. Other catalysts existing or subsequently developed could also be used if similarly capable of the function described for the palladium atoms in the above examples. For aqueous recharging, acids other than those noted above could be used including but not limited to other relatively weak acids, very strong acids such as hydrofluoric acid and hydrochloric acid, as well as others known to those skilled in the art. Buffering of the recharge solution is also an option, as it is known that the pH of a solution will affect the solution's influence on the porous silicon matrix, extant hydrogen atoms, and deposited catalyst.

Various techniques exist and could be used for catalyst deposition. As nonlimiting examples, catalytic metals can be deposited onto a porous material surface by electro- or electroless-deposition (ELD), and by electrochemical deposition (ECD) as taught in Cho et al., "An in situ ATR-FTIR Study on Palladium Displacement Reaction on Hydrogen-Terminated Silicon Surface," J. Electrochem. Soc. 152 (6) C348-C355 (2005), and Harraz et al., "Different Behavior in Immersion Plating of Nickel on Porous Silicon from Acidic and Alkaline Fluoride Media," J. Electrochem. Soc. 150 (5) C227-C284 (2003). These methods, plus others known in the fields of electrochemistry, plating, and surface chemistry include potentially important variants to the techniques discussed above. As an example, there may be nucleation sites on the hydrogen-terminated silicon matrix that have either a paucity of hydrogen atoms or a low-energy silicon configuration. These sites can accept a deposited catalyst atom (or particle) in addition to the methods described above. These and other deposition processes may have additional benefits for the performance and/or manufacturability of certain solid-state hydrogen storage materials.

Additional surface treatments may be used either prior to, or subsequent to, the partial dehydrogenation step described above. These steps may include chemical treatments used to clean surfaces, as is well known to those skilled in the art and especially those skilled in the integrated circuit industry, as well as gaseous treatments including solvents or reactive gasses that modify the media surface to be more amenable to partial dehydrogenation or catalyst doping. Plasma methods may also be used for cleaning or surface activation, in combination with gasses and/or temperature, using means well known to those skilled in these arts. Included is the chemical vapor deposition of silicon or other elements to either strengthen the porous silicon framework or to increase the surface area available for hydrogen adsorption. Electrochemical means may also be used for cleaning, surface activation, or silicon deposition in accordance with techniques known to those skilled in the art.

Figure 5:
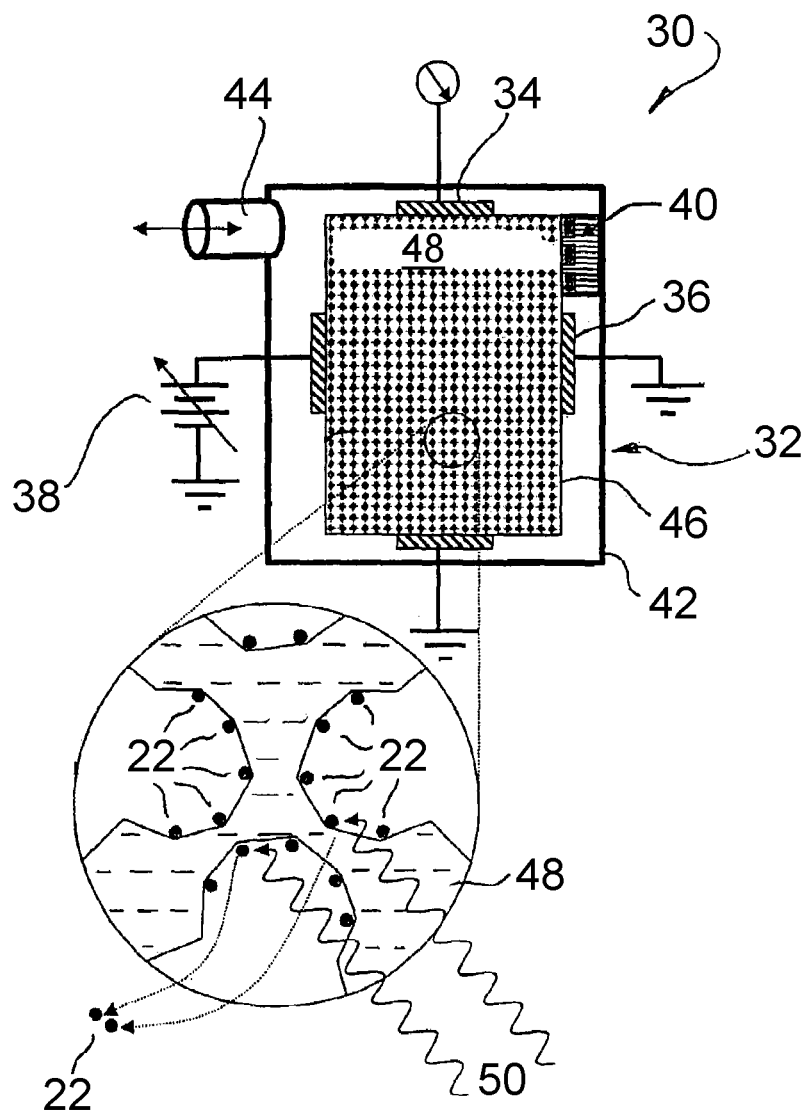
FIGS. 5 and 6 are schematic representations of embodiments of hydrogen storage and retrieval systems capable of using porous storage materials and performing hydrogenation and dehydrogenation processes of the present invention.
Figure 6:
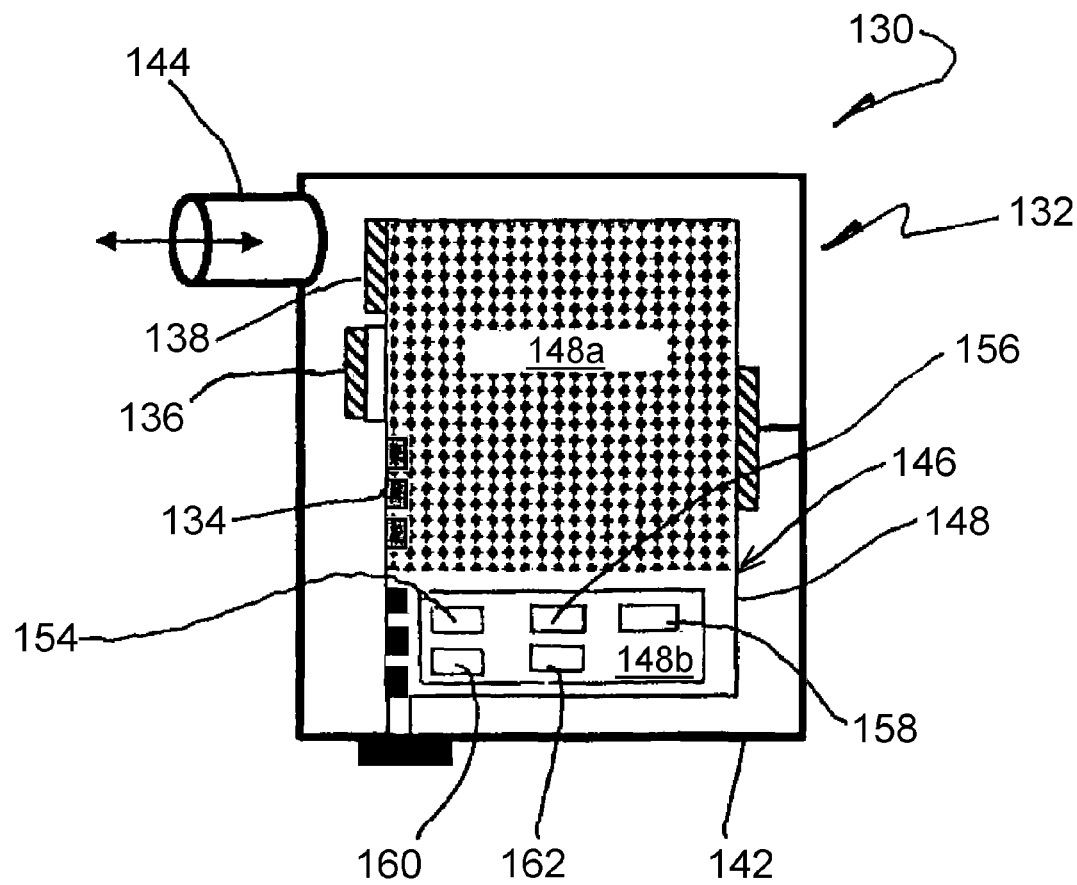
Figure 7:
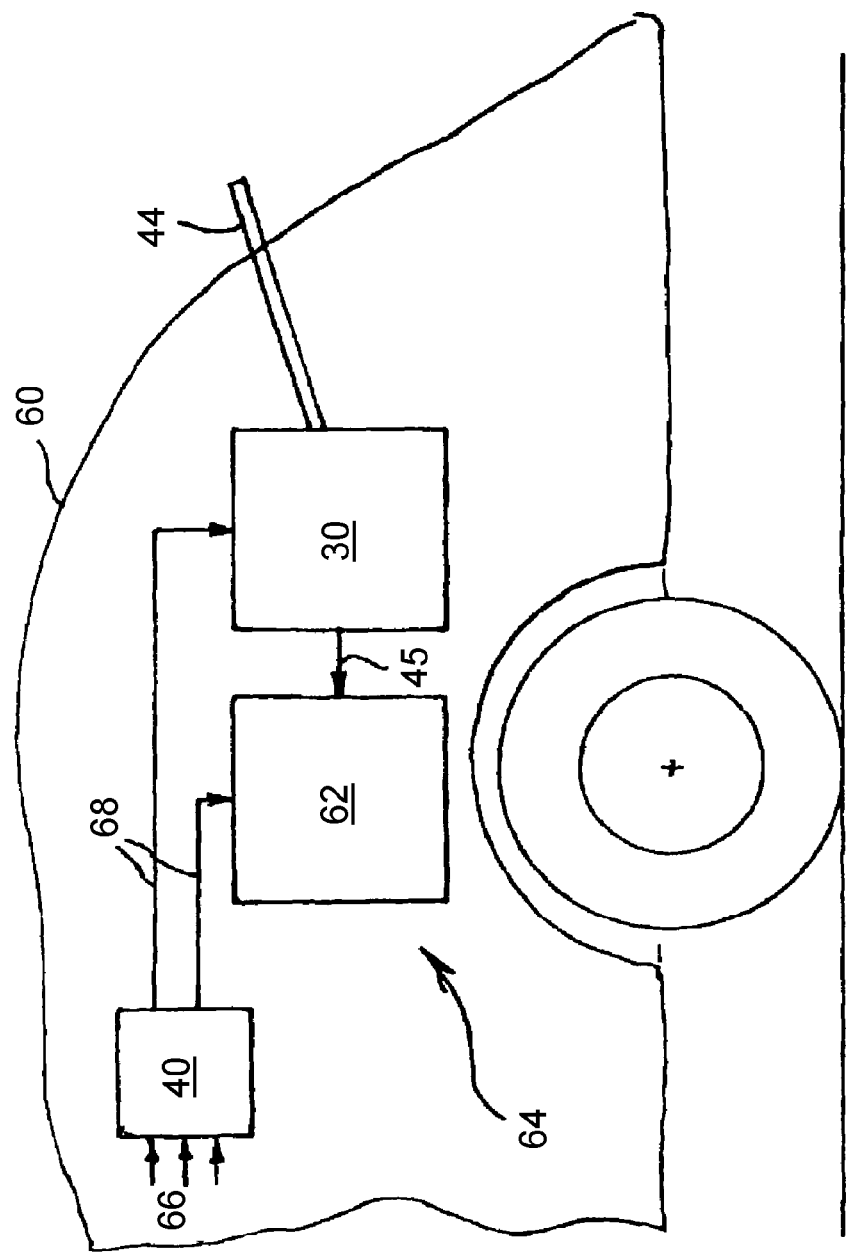
FIG. 7 is a block diagram of the hydrogen storage and retrieval system of FIG. 5 installed in a vehicle and adapted for fueling a fuel cell system of the vehicle.

Referring now to FIGS. 5 through 7, storage and retrieval systems are represented that are capable of making use of porous storage materials and performing hydrogenation and dehydrogenation processes as described above. FIG. 5 represents an elemental hydrogen storage and retrieval system 30 that includes a hydrogen storage unit 32, light source 34, current source 36, voltage source 38, and control system 40. The hydrogen storage unit 32 includes a housing 42 having an inlet/outlet passage 44. Of course, separate inlet passages may be provided as desired (for example, 44 and 45, as shown in FIG. 7) to facilitate refueling, for example, of storage system 30. The housing 42 can be constructed of one or more of a variety of materials, such as, for example, relatively light-weight plastic, aluminum, alloys, or steel, dependent primarily upon the environmental and other requirements of the particular application for which the system 30 is intended. The particular size of the housing 42 is also dependent primarily upon the requirements, such as the required power, of the particular application for which hydrogen storage and retrieval system 30 is intended. This flexibility in the materials and size of housing 42 is afforded due to the ability of the present invention to safely retain elemental hydrogen even upon catastrophic failure of housing 42.

One or more hydrogen storage elements 46 are disposed within the housing 42. Generally, each hydrogen storage element 46 comprises a porous storage material 48, for example, one or more of the solid-state porous storage materials described above, including the porous silicon matrix 10 of FIG. 4, and utilize one or more of the hydrogenation and dehydrogenation techniques described above, by which hydrogen atoms 22 are adsorbed and selectively desorbed, or released, to reform hydrogen molecules ($H_2$) that can then be recovered as gaseous hydrogen for fuel. The hydrogen atoms 22 are selectively and desorbed/released or retrieved in response to various sources of stimulus and/or energy. The hydrogen storage and retrieval system 30 illustrated in FIG. 5 is represented as included three different types of such energy sources, namely, the light source 34, current source 36, and voltage source 38.

In operation, the light source 34, such as, for example, a light-emitting diode, emits photon energy 50 and is disposed internal or external to the housing 42 whereby the emitted photon energy 50 can interact with the plurality of hydrogen storage elements 46 within the housing 42. The light source 34 emits sufficient photonic energy 50 to liberate or dislodge adsorbed hydrogen atoms 22 from their bonds to the hydrogen storage elements 46. The light source 34 is electrically interconnected with and controlled by the control system 40 to direct a desired amount of photon energy 50 onto and thereby liberate a desired quantity of adsorbed hydrogen atoms 22 from the hydrogen storage elements 46. The liberated hydrogen atoms 22, in turn, form a flow of hydrogen molecules ($H_2$) that is directed from the hydrogen storage unit 32 into, for example, a hydrogen-based fuel cell system 62 represented in FIG. 7. The fuel cell system 62 receives the flow of hydrogen molecules and converts in a known manner the hydrogen contained therein to a desired amount of electrical power.

Similarly, the current source 36, such as, for example, a Joule heat source that generates heat by passing a current through the silicon matrix of hydrogen storage elements 46, is disposed internal or external to the housing 42. The current source 36 emits sufficient energy to desorb or liberate adsorbed hydrogen atoms 22 from their bonds to the hydrogen storage elements 46. The current source 36 is also electrically interconnected with and controlled by the control system 40 to control the amount of current being directed through each of the plurality of storage elements 46, and thereby liberate a desired quantity of adsorbed hydrogen atoms 22 from the hydrogen storage elements 46. The liberated hydrogen atoms 22, in turn, form a flow of hydrogen molecules that is directed out of the hydrogen storage unit 32 and into the hydrogen-based fuel cell system 62, which receives the flow of hydrogen molecules and converts in a known manner the hydrogen contained therein to a desired amount of electrical power.

Still similarly, the voltage source 38, such as, for example, a battery, is disposed internal or external to the housing 42. The voltage source 38 creates a sufficiently intense electric field to desorb or liberate adsorbed hydrogen atoms 22 from their bonds to the hydrogen storage elements 46. The voltage source 38 is also electrically interconnected with and controlled by the control system 40 to control the amount of voltage being applied to each of the plurality of storage elements 46, which in turn controls the quantity of adsorbed hydrogen atoms 22 that are liberated from the hydrogen storage elements 46. The liberated hydrogen atoms 22, in turn, form a flow of hydrogen molecules that is directed out of the hydrogen storage unit 32 and into the hydrogen-based fuel cell system 62, which receives the flow of hydrogen molecules and converts in a known manner the hydrogen contained therein to a desired amount of electrical power.

FIG. 7 represents the storage and retrieval system 10 of FIG. 5 used to store fuel for and provide fuel to a hydrogen-based fuel cell system 62, such as, for example, a solid oxide fuel cell system or a proton exchange membrane fuel cell system. In turn, hydrogen-based fuel cell system 62 provides electrical power to virtually any apparatus requiring electrical power to operate, for example, the electrical accessories and/or electrical motors of motor vehicle 60. FIG. 7 represents the combination of hydrogen storage and retrieval system 30, the control system 40, and fuel cell system 62 as defining an auxiliary power unit (APU) 64 for generating electricity from hydrogen and oxygen. It should be understood that an APU 64 in accordance with the present invention can be alternately configured, for example, with the elemental hydrogen storage and retrieval system 10 and fuel cell system 62 being stationary, in order to power one or more electrical appliances within, for example, a house or business.

The control system 40, such as, for example, a conventional microcomputer or microprocessor, receives a plurality of inputs 66 which are indicative of the amount of output power desired from fuel cell system 62 and various other operating parameters, such as, for example, ambient temperature. The control system 40 also issues a plurality of outputs 68, including outputs that control at least in part the operation and output levels of the light source 34, heat source 36, and/or voltage source 38. The control system 40 also includes and executes operating and control software enabling it to control the operation of the elemental hydrogen storage and retrieval system 30 and, optionally, the fuel cell system 62.

The storage and retrieval system 10 may assume a wide variety of shapes, sizes, and aspect ratios. For example, in vehicle applications, an advantage of the present invention is that hydrogen storage may be distributed in "unused" spaces throughout the vehicle, instead of requiring single point storage such as a prior art gasoline tank. Thus, hydrogen may conveniently be stored within floors, fenders, quarter panels, rocker panels, doors, columns, posts, trunk, roof, and combinations thereof.

Referring now to FIG. 6, there is shown a second embodiment of a system 130 for the storage and retrieval of elemental hydrogen of the present invention. The elemental hydrogen storage and retrieval system 130 is represented in FIG. 6 as including several component parts that are the same as or similar to the component parts of the elemental hydrogen storage and retrieval system 30 of FIG. 5, and corresponding reference numbers are used to indicate corresponding parts. The elemental hydrogen storage and retrieval system 130 includes a hydrogen storage unit 132, a housing 142 having an inlet/outlet 144, and multiple hydrogen storage elements 146. Generally, the storage and retrieval system 130 integrates the desorption energy sources and the control electronics directly onto hydrogen storage elements 146, as follows.

A plurality (only one shown) of hydrogen storage elements 146 are disposed within the housing 142. The storage elements 146 are constructed at least in part of single-crystal silicon wafers 148. Thus, hydrogen storage elements 146 of FIG. 6 and the hydrogen storage elements 46 of FIG. 5 can be substantially similar to each other in regard to the method by which they adsorb and desorb hydrogen atoms 22. However, and in general, the single-crystal silicon wafers 148 used to form the storage elements 146 are selectively processed over their surface areas to increase the porosity of a first portion 148a thereof, and to fabricate electronic components and circuitry on a second portion 148b thereof. More particularly, the first portion 148a of the single-crystal silicon wafer 148 is processed, as is described more particularly hereinafter, to increase the surface area and/or porosity thereof, such that elemental hydrogen will readily bond and/or adsorb onto, and be selectively and relatively-easily desorbed from, the first portion 148a of each hydrogen storage element 146. The second portion 148b of each hydrogen storage member 146 is not processed in order to increase the porosity thereof, as is the first portion 148a. Rather, the second portion 148b is processed according to conventional IC processing techniques to form thereupon integrated control and diagnostic circuitry, including, for example, transistors 154, resistors 156, capacitors 158, memory cells or arrays 160, and sensors 162.

Thus, hydrogen storage element 146 integrates onto a monocrystalline silicon wafer 148 the hydrogen storage function and various first-level control and diagnostic functions. By forming the memory cells/arrays 160 onto the second portion 148b of the silicon wafer 148, a history of the amount of hydrogen adsorbed and desorbed may be stored directly on the hydrogen storage element 146. Diagnostic functions may also be performed through the execution by hydrogen storage element 146 of control and monitoring algorithms stored within memory cells/arrays 160, especially in coordination with the control system 40. Such algorithms can monitor various operating parameters, such as, for example, bulk resistance, diode luminosity, surface condition, etc., by reading the sensors 162. Thus, a user can be alerted as to how much power remains in the hydrogen storage elements 146 powering fuel cell system 62, and whether any one or more of hydrogen storage elements 146 requires service or repair.

It should be particularly noted that the structures required for the emission of photonic energy are integrated into second portion 148a of the hydrogen storage element 146 using conventional integrated circuit fabrication processes. More particularly, a light source 134 such as light-emitting diodes configured for emitting photonic energy of a desired wavelength may be fabricated directly in the porous silicon within the first portion 148a of the silicon wafer 148 according to known methods. One such method for forming light-emitting diodes in porous silicon is disclosed in U.S. Pat. No. 5,272,355 (Namavar, et al.) and U.S. Pat. No. 5,285,078 (Mimura, et al), the disclosures of which are incorporated herein by reference.

It should further be particularly noted that the structures required for the Joule heating and electric field generation may also be integrated into the silicon wafer 148 of the hydrogen storage element 146 through the use of conventional processes and structures for forming integrated circuits on silicon wafers. For example, Joule heating may be accomplished by passing an electrical current through one or more electrodes or traces 136 fabricated upon the silicon wafer 148 so that heat is passed through either portion 148a or portion 148b of the wafer 148 to affect desorption. Electric field creation can be accomplished by fabricating spaced-apart electrodes or traces 138 upon the silicon wafer 148 of the hydrogen storage element 146, and applying a potential or voltage difference between the electrodes 138 to thereby create an electric field, to affect desorption.

As disclosed above, the hydrogen storage elements 46 and 146 are formed of a porous storage material 48/148 to which elemental hydrogen will readily bond, such as, for example, a block or wafers of monocrystalline silicon that have been processed to have an increased surface area and/or porosity, and from which elemental hydrogen is selectively and relatively easily desorbed/released or retrieved in response to an applied stimulus. In addition to the processes described above, various other methods of forming silicon into a crystalline matrix having semiconductive properties and methods of selectively forming regions of porous silicon in a semiconductive crystalline matrix are well known and need not be discussed in any great detail here. For example, applying a mixture of even parts of hydrofluoric acid and methanol to a crystalline silicon matrix at a current density of 50 milliamps (mA) per square centimeter ($cm^2$) renders single-crystal silicon porous, as is more fully described in "Infrared Free Carrier Absorption in Mesoporous Silicon," Rapid Research Notes, Phys. Stat. Sol, (b) 222, R1 (2000) by V. Yu Timoshenko, Th. Dittrich, and F. Kock, which is incorporated herein by reference. Applying these conditions for a period of approximately thirty minutes creates a layer of porous silicon approximately 75 micrometers thick having a porosity of approximately 50%. The remaining nanocrystals are approximately 5 to 10 nm in extent, and represent interconnected islands of single-crystal silicon within a voided space. This layer of porous silicon has a substantially reduced gross density and a surface area that is substantially increased over that of the crystalline silicon prior to such processing. Yet another method of selectively forming regions of porous silicon in a semiconductive crystalline matrix is taught in U.S. Pat. No. 6,407,441 (Yuan), which is incorporated herein by reference.

The activation energies, i.e., the adsorption and desorption energies of hydrogen on the porous material 48 or 148 (for example, the silicon matrix 10 of FIG. 4), must be controlled. This is accomplished in part by the processing of the material 48 or 148. In the present invention, chemical activation involves the use of a catalyst, for example, palladium and/or other noble metals, transition metals, and other metals, as described above. During use of the hydrogen storage elements 46 and 146, activation energies can be controlled through one or more techniques, including temperature, electric fields, and photon energy. Controlling ambient temperature or the temperature of hydrogen storage elements 46 and 146 affects the activation energies, which follow an Arrhenius law and are thus generally exponential dependent upon temperature. Raising the temperature of the porous material 48/148 of the hydrogen storage elements 46 and 146 increases the thermal energy of the adsorbed hydrogen therein and tends to cause desorption of the hydrogen which then moves as a gas through the voids in the material 48/148. Conversely, cooling the porous material 48/148 of the hydrogen storage elements 46 and 146 reduces the thermal energy of the adsorbed hydrogen and tends to reduce desorption.

The application of an electric field across the porous material 48/148 of the hydrogen storage elements 46 and 146 also affects the activation energies. By applying a large electric field across the porous material 48/148, desorption is promoted. Similarly, photonic energy can be applied to promote desorption. Silicon is relatively transparent to radiation at infra-red wavelengths above approximately 700 nanometers (nm). The hydrogen atom has a very strong absorption peak at approximately 660 nanometers, which falls within the range of silicon transparency. Thus, the desorption rate of hydrogen stored within or bonded to the silicon of hydrogen storage elements 46 and 146 may be affected through the application of photonic energy at certain wavelengths and intensities. The light source(s) 34/134 are preferably configured as emitting light or photonic energy having a wavelength of approximately 660 nm, for absorption by the hydrogen atoms to promote desorption of the hydrogen from the silicon surfaces.

Controlling the adsorption and desorption energies through one or more of the methods described above enables the elemental hydrogen storage and retrieval systems 30 and 130 to be adapted to a variety of specific applications. For example, in applications wherein safety is a primary consideration, such as, for example, a motor vehicle, high adsorption energies may be selected to more strongly bind the hydrogen atoms to the porous material 48/148 within hydrogen storage elements 46 and 146. At high adsorption energies, the hydrogen atoms can remain tightly bound to the material 48/148 of the hydrogen storage elements 46 and 146 even upon a catastrophic equipment failure, such as, for example, a breach of the housing 42/142 and/or shattering of the hydrogen storage elements 46/146 themselves in a vehicle collision. However, higher adsorption energies require higher desorption energies to retrieve the hydrogen fuel. Thus, a combination of Joule heating, application of electric fields, and/or light may be required to facilitate rapid retrieval in normal operation.

It should be noted that the crystalline silicon which is processed as described above to produce the porous silicon typically may be doped or impregnated with one or more other elements, commonly boron, which renders the silicon highly conductive and thereby facilitates the formation of porous silicon. However, if photon energy is to be applied to achieve or facilitate desorption, further processing of the silicon, such as, for example, a counter-doping with phosphorous or arsenic may be required to maintain transparency of the porous silicon to infra-red light.

In the embodiments represented in FIGS. 5 and 6, three different types of desorption energy sources are shown, i.e., the light sources 34/134, heat sources 36/136 and voltage sources 38/138. However, it should be understood that the hydrogen storage and retrieval systems 30 and 130 can be alternately configured, for example, with only one or two, or with various configurations of, the energy sources shown and/or with other types of energy sources suitable for applying a sufficient energy in a controlled manner for breaking the bonds between the adsorbed elemental hydrogen and hydrogen storage elements 46 and 146.

While the invention has been described in terms of particular embodiments, it is apparent that other forms could be adopted by one skilled in the art. Therefore, the scope of the invention is to be limited only by the following claims.

The invention claimed is:
1. A system for storing and retrieving elemental hydrogen, said system comprising:
  a housing;
  a hydrogen storage element enclosed within the housing, the hydrogen storage element comprising a solid-state hydrogen storage material, at least a portion of the solid-state hydrogen storage material comprising:
    a porous matrix material comprising atoms of a first element capable of bonding with more than one hydrogen atom per atom of the first element, the atoms of the first element being molecularly arranged within the porous matrix material so that first atoms of the first element have more bond sites than second atoms of the first element and at least some of the bond sites of the first atoms have lower levels of bonding energy than the bond sites of the second atoms;
    hydrogen atoms adsorbed to the second atoms of the first element; and
    atoms of a second element covalently bonded to the first atoms of the first element and distributed within the porous matrix material, the second element being chosen from the group consisting of noble metals and transition metals; and
  a control system for regulating storage of hydrogen into and retrieval of hydrogen from the solid-state hydrogen storage material;

wherein the atoms of the second element are covalently bonded to the first atoms of the first element by:

fully hydrogenating the porous matrix material with the hydrogen atoms so that the hydrogen atoms are adsorbed to the second atoms of the first element within the porous matrix material and other hydrogen atoms are adsorbed to the first atoms of the first element within the porous matrix material, at least some of the bond sites of the first atoms having lower bond energies than the bond sites of the second atoms of the first element;

removing the other hydrogen atoms from at least some of the first atoms of the first element without removing the hydrogen atoms bonded to the second atoms of the first element at higher bond energies; and then covalently bonding the atoms of the second element to the first atoms of the first element distributed within the porous matrix material and from which the other hydrogen atoms were removed.

2. The system according to claim 1, wherein the first element is in a material that is chosen from the group consisting of silicon, alumina, activated carbon, metal hydrides, metal nitrides, and zeolites.

3. The system according to claim 1, wherein the first element is silicon.

4. The system according to claim 1, wherein the second element is palladium.

5. The system according to claim 1, wherein the housing contains at least a second hydrogen storage element of claim 1.

6. The system according to claim 1, wherein the hydrogen storage element further comprises electronic integrated circuits on a surface portion of the solid-state hydrogen storage material.

7. The system according to claim 1, the system further comprising means for releasing stored hydrogen from the solid-state hydrogen storage material.

8. The system according to claim 7, wherein the releasing means is selected from the group consisting of light sources, current sources, voltage sources, and combinations thereof.

9. A system for storing and retrieving elemental hydrogen, said system comprising:

a housing;

a hydrogen storage element enclosed within the housing, the hydrogen storage element comprising a solid-state hydrogen storage material, at least a portion of the solid-state hydrogen storage material comprising:

a porous matrix material comprising atoms of a first element capable of bonding with more than one hydrogen atom per atom of the first element, the atoms of the first element being molecularly arranged within the porous matrix material so that different atoms of the first element have bond sites available for different numbers of hydrogen atoms at correspondingly different levels of bonding energy;

hydrogen atoms molecularly bonded to atoms of the first element, some atoms of the first element having more hydrogen atoms bonded thereto than other atoms of the first element; and atoms of a second element capable of molecularly bonding to atoms of the first element and the hydrogen atoms, the atoms of the second element being bonded to those atoms of the first element having bond sites for more than one hydrogen atom and as a consequence at lower bond energies than the bond sites of those atoms of the first element to which a fewer number of hydrogen atoms are bonded;

a control system for regulating storage of hydrogen into and retrieval of hydrogen from the solid-state hydrogen storage material; and means for releasing stored hydrogen from the solid-state hydrogen storage material, wherein the releasing means comprises a light source that emits photon energy at a wavelength of about 660 nanometers and transmits the photon energy through the porous matrix material and onto the bond sites to liberate the hydrogen atoms molecularly bonded to the atoms of the first element.

10. The system according to claim 9, wherein the light source comprises a light-emitting diode.

11. The system according to claim 7, wherein the releasing means comprises at least one current source, at least one voltage source, or a combination thereof.

12. The system according to claim 1, wherein the system is a component of an auxiliary power unit for generating electrical power.

13. The auxiliary power unit of claim 12.

14. The auxiliary power unit of claim 13, wherein the auxiliary power unit comprises:

the system for storing and retrieving elemental hydrogen; and a fuel cell system coupled to the system and adapted to receive hydrogen from the system and combine the hydrogen with oxygen to produce electrical power.

15. The auxiliary power unit according to claim 14, wherein the control system controls the operation of the auxiliary power unit.

16. The auxiliary power unit according to claim 14, wherein the fuel cell system is chosen from the group consisting of solid oxide fuel cell systems and proton exchange membrane systems.

17. The auxiliary power unit according to claim 13, wherein the auxiliary power unit is installed in a vehicle.

18. The vehicle of claim 17.

19. The vehicle according to claim 17, the vehicle comprising at least one additional housing of claim 1, each of the housings containing at least one hydrogen storage element of claim 1, the housings being distributed in different locations within the vehicle.

20. The vehicle according to claim 19, wherein the different locations are chosen from the group consisting of floors, fenders, quarter panels, rocker panels, doors, columns, posts, trunk, roof, and combinations thereof.

* * * * *